US010772030B2

(12) United States Patent
Shahid

(10) Patent No.: US 10,772,030 B2
(45) Date of Patent: Sep. 8, 2020

(54) MOTION-BASED MANAGEMENT OF A WIRELESS PROCESSOR-BASED DEVICE

(71) Applicant: Intel Corporation, Santa Clara, CA (US)

(72) Inventor: Mohammad Shahid, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 15/274,833

(22) Filed: Sep. 23, 2016

(65) Prior Publication Data
US 2017/0013540 A1 Jan. 12, 2017

Related U.S. Application Data

(63) Continuation of application No. 13/992,730, filed as application No. PCT/US2012/031375 on Mar. 30, 2012, now abandoned.

(51) Int. Cl.
H04W 4/00 (2018.01)
H04W 48/04 (2009.01)
H04W 48/18 (2009.01)
H04W 36/32 (2009.01)
H04W 4/02 (2018.01)
H04W 36/14 (2009.01)
(Continued)

(52) U.S. Cl.
CPC .......... H04W 48/04 (2013.01); H04W 4/027 (2013.01); H04W 36/14 (2013.01); H04W 36/32 (2013.01); H04W 48/18 (2013.01); H04W 84/042 (2013.01); H04W 84/12 (2013.01)

(58) Field of Classification Search
CPC .................................................. H04W 48/18
See application file for complete search history.

(56) References Cited

U.S. PATENT DOCUMENTS 8,065,508 B2 * 11/2011 Rubin ............... H04M 1/72563
713/1
8,103,291 B2 1/2012 Rippon et al.
8,203,528 B2 6/2012 Spalink
(Continued)

FOREIGN PATENT DOCUMENTS

JP 2008244532 A 10/2008
WO WO-2011058820 A1 5/2011
WO WO-2013147832 A1 10/2013

OTHER PUBLICATIONS

"U.S. Appl. No. 13/992,730, Non Final Office Action dated Oct. 11, 2016", 19 pgs.
(Continued)

Primary Examiner — Guang W Li
(74) Attorney, Agent, or Firm — Schwegman Lundberg & Woessner, P.A.

(57) ABSTRACT

A mobile device may be managed based on information about a geographic movement of the mobile device. The geographic movement may take into account a location, a speed, and an acceleration for the mobile device. A movement profile is determined based on the geographic movement. A settings profile is determined based on the movement profile and a profile mapping. Based on the settings profile, resource consumption for the mobile device may be managed by adjusting settings for the device accordingly.

20 Claims, 1 Drawing Sheet

(51) Int. Cl.
*H04W 84/04* (2009.01)
*H04W 84/12* (2009.01)

(56) References Cited

U.S. PATENT DOCUMENTS

| | | | | |
|---|---|---|---|---|
| 8,280,438 | B2* | 10/2012 | Barbera | H04M 1/72577 455/345 |
| 8,570,993 | B2* | 10/2013 | Austin | H04W 88/06 370/338 |
| 8,589,066 | B2 | 11/2013 | Haleem | |
| 8,666,399 | B2* | 3/2014 | Kholaif | H04W 48/16 455/434 |
| 2006/0172736 | A1 | 8/2006 | Nevo | |
| 2006/0187847 | A1* | 8/2006 | Pelton | H04W 4/025 370/252 |
| 2007/0179689 | A1 | 8/2007 | Soulie et al. | |
| 2008/0165737 | A1* | 7/2008 | Uppala | H04W 36/32 370/331 |
| 2008/0299954 | A1* | 12/2008 | Wright | H04W 4/029 455/414.1 |
| 2009/0023458 | A1 | 1/2009 | Mountney | |
| 2009/0132197 | A1* | 5/2009 | Rubin | G06F 15/177 702/141 |
| 2009/0153341 | A1 | 6/2009 | Spalink | |
| 2009/0195445 | A1 | 8/2009 | Dehaas | |
| 2009/0298496 | A1* | 12/2009 | Pettersson | H04W 36/32 455/434 |
| 2010/0056181 | A1 | 3/2010 | Rippon et al. | |
| 2010/0103829 | A1 | 4/2010 | Murzeau et al. | |
| 2010/0216509 | A1* | 8/2010 | Riemer | H04M 1/72577 455/557 |
| 2011/0171943 | A1* | 7/2011 | Raviv | H04W 48/04 455/418 |
| 2011/0172918 | A1* | 7/2011 | Tome | G01C 21/165 701/500 |
| 2012/0008595 | A1* | 1/2012 | Wang | H04W 36/385 370/331 |
| 2012/0052907 | A1* | 3/2012 | Gilbreath | H04M 1/6041 455/556.1 |
| 2012/0122452 | A1* | 5/2012 | Brisebois | H04W 4/025 455/434 |
| 2012/0163344 | A1* | 6/2012 | Bakthavathsalu | H04W 36/00 370/332 |
| 2012/0184325 | A1* | 7/2012 | Hsieh | H04W 4/027 455/550.1 |
| 2012/0281605 | A1 | 11/2012 | Himmelstein | |
| 2012/0289244 | A1* | 11/2012 | Goyal | G01S 19/34 455/456.1 |
| 2013/0044741 | A1* | 2/2013 | Lappetelainen | H04W 36/0066 370/338 |
| 2013/0084856 | A1* | 4/2013 | Prasad | H04W 36/0088 455/434 |
| 2013/0109409 | A1 | 5/2013 | Ortiz | |
| 2013/0137450 | A1 | 5/2013 | Dai et al. | |
| 2013/0165111 | A1 | 6/2013 | Willins | |
| 2013/0204795 | A1 | 8/2013 | Dinan | |
| 2013/0337813 | A1* | 12/2013 | Van Phan | H04W 36/08 455/436 |
| 2013/0343343 | A1 | 12/2013 | Shahid | |
| 2014/0247807 | A1* | 9/2014 | Westerberg | H04W 36/34 370/331 |
| 2015/0011249 | A1 | 1/2015 | Siliski et al. | |
| 2015/0327147 | A1* | 11/2015 | Ganesan | H04M 1/2535 455/436 |
| 2017/0078956 | A1* | 3/2017 | LeBlanc | H04W 48/18 |

OTHER PUBLICATIONS

"U.S. Appl. No. 13/992,730, filed Jan. 9, 2017 to Non Final Office Action dated Oct. 11, 2016", 10 pgs.
"U.S. Appl. No. 13/992,730, Advisory Action dated Jun. 29, 2016", 2 pgs.
"U.S. Appl. No. 13/992,730, Final Office Action dated May 17, 2016", 24 pgs.
"U.S. Appl. No. 13/992,730, Final Office Action dated Sep. 25, 2015", 23 pgs.
"U.S. Appl. No. 13/992,730, Non Final Office Action dated Feb. 4, 2016", 21 pgs.
"U.S. Appl. No. 13/992,730, Non Final Office Action dated Apr. 27, 2015", 20 pgs.
"U.S. Appl. No. 13/992,730, Preliminary Amendment filed Jun. 8, 2013", 6 pgs.
"U.S. Appl. No. 13/992,730, Response filed Mar. 24, 2016 to Non Final Office Action dated Feb. 4, 2016", 6 pgs.
"U.S. Appl. No. 13/992,730, Response filed Jun. 21, 2016 to Final Office Action dated May 17, 2016", 6 pgs.
"U.S. Appl. No. 13/992,730, Response filed Jul. 1, 2015 to Non Final Office Action dated Apr. 27, 2015", 6 pgs.
"U.S. Appl. No. 13/992,730, Response filed Nov. 19, 2015 to Final Office Action dated Sep. 25, 2015", 6 pgs.
"International Application Serial No. PCT/US2012/031375, International Preliminary Report on Patenatability dated Oct. 9, 2014", 6 pgs.
"International Application Serial No. PCT/US2012/031375, International Search Report dated Nov. 20, 2013", 3 pgs.
"International Application Serial No. PCT/US2012/031375, Written Opinion dated Nov. 20, 2012", 4 pgs.
U.S. Appl. No. 13/992,730, filed Sep. 11, 2013, Motion-Based Management Of A Wireless Processor-Based Device.
"U.S. Appl. No. 13/992,730, Advisory Action dated Jul. 24, 2017", 3 pgs.
"U.S. Appl. No. 13/992,730, Final Office Action dated May 3, 2017", 19 pgs.
"U.S. Appl. No. 13/992,730, Response filed Jul. 3, 2017 to Final Office Action dated May 3, 2017", 10 pgs.

* cited by examiner

MOTION-BASED MANAGEMENT OF A WIRELESS PROCESSOR-BASED DEVICE

PRIORITY APPLICATIONS

This application is a continuation of U.S. patent application Ser. No. 13/992,730, filed on Sep. 11, 2013, which application is a U.S. National Stage Filing under 35 U.S.C. § 371 from International Application No. PCT/US2012/031375, filed on Mar. 30, 2012, and published as WO 2013/147832 on Oct. 3, 2013, which applications and publication are incorporated herein by reference in their entirety.

TECHNICAL FIELD

This relates to resource management of a wireless processor-based device.

BACKGROUND ART

Mobile processor-based devices include things like cellular telephones, laptop computers, mobile Internet devices, and processor-based games to mention a few examples. Some mobile processor-based devices include wireless communication protocols. The available protocols include short range protocols such as the Bluetooth protocols, longer range protocols including the Wi-Fi protocol, and still longer range protocols including cellular protocols, and/or a Wi-MAX protocol to mention some examples.

Many wireless mobile processor-based devices are capable of selecting among more than one wireless protocol. For example many cellular phones attempt to use a Wi-Fi wireless protocol to the greatest possible extent to reduce cellular phone charges. In many cases, a shorter range protocol is fine as long as the user is in range of an appropriate access point or base station. Many wireless mobile processor-based devices switch between one protocol and another based on availability of a preferred or default wireless protocol and the availability of other options.

BRIEF DESCRIPTION OF THE DRAWINGS

Some embodiments are described with respect to the following figures.

DETAILED DESCRIPTION

Figure 1:
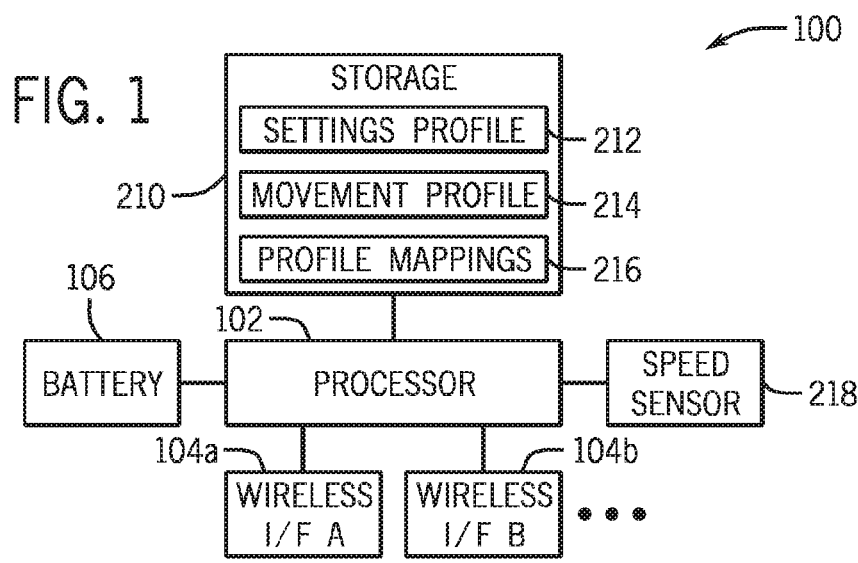
FIG. 1 is a block diagram of a wireless processor-based device in accordance with one embodiment.

A wireless mobile processor-based device may select a wireless communication protocol based, at least in part, on a characteristic of the motion of the mobile device. For example when the device is being used by a person who is walking past a Wi-Fi access point, it may be reasonable for the device to use a Wi-Fi wireless protocol. When the same user, carrying the same device, is going by the same access point on a highway at sixty miles an hour, it may make more sense to use a cellular wireless communication protocol, even when the user is completely within range of the Wi-Fi access point. This is because it may be inefficient in a number of ways to use the Wi-Fi access point for a very short period of time determined by the speed of the mobile device.

For example constantly switching between wireless protocols or using wireless protocols for a only short time may result in inefficient operation, poor performance and excessive power consumption. Thus, in some embodiments, a processor associated with the mobile device selects or de-selects a wireless communication protocol based, at least in part, on the speed of the mobile device.

As an example, a user carrying a cellular telephone may walk around inside a building and use a Wi-Fi access point to communicate over a Wi-Fi communication protocol while the user is in the building. Then when the user walks out of the building, the user may continue to use the Wi-Fi access point. After the user gets in the user's car and starts to drive away, the device may switch from the Wi-Fi access point to a cellular base station based on the detected speed of the cellular telephone. In other words the device may not wait to lose the link and may switch wireless communication protocols based on speed, the speed basically being a predictor that the Wi-Fi link will be lost in some cases. This allows the protocol switch to occur before the Wi-Fi communication is lost.

Further, in some embodiments, a Wi-Fi interface for the device that makes use of the Wi-Fi communication protocol may be disabled or powered down when the user and device are travelling in a car. This may be because searching for and using a Wi-Fi connection in such a circumstance is not desirable. By disabling or powering down the Wi-Fi interface, device resources that would otherwise be dedicated to the Wi-Fi interface are not wasted.

In other embodiments, for example when the user is going by a Wi-Fi access point in a car at a high speed, avoiding a transition to a Wi-Fi preferred wireless communication protocol may improve performance and power consumption. This may be because witching to the Wi-Fi communication protocol for an instant will neither improve performance nor reduce communication charges and will probably result in increasing battery consumption.

Embodiments may relate to the use of wireless communication protocols or standards including but not limited to cellular networks, Bluetooth (IEEE (Institute of Electrical and Electronics Engineers) 802.15 standard, IEEE 802.15.1-2002, published Jun. 14, 2002), Wi-Fi (IEEE 802.11 standard, IEEE 802.11-2007, published Jun. 12, 2007), and Wi-MAX (IEEE 802.16 standard, IEEE 802.16-204, published Oct. 1, 2004).

Referring to FIG. 1, a wireless processor-based device 100 may include a processor 102. The processor 102 in one embodiment may be coupled to a speed sensor 218. The speed sensor 218 may be any of a variety of well-known speed sensors including devices using global positioning system (GPS) information to determine speed, accelerometers, and any other technique for determining speed including wireless triangulation. In one embodiment, the processor 102 may be coupled to a motion sensor (not shown) using one or more speed sensors 218 to determine speed, acceleration, and location. In some embodiments, the speed sensor 218 or motion sensor may also make use of an altitude meter (not shown). Also coupled to the processor 102 are a plurality of wireless interfaces 104a through 104b. Any number of wireless interfaces may be provided to implement any given number of wireless communication protocols available to the device 100. Examples of possible wireless communication protocols include cellular communication protocols, Bluetooth communication protocols, Wi-Fi communication protocols, and Wi-MAX communication protocols, as examples. Also coupled to the processor 102, in some embodiments, is a battery 106. A storage 210 may be any optical, magnetic, or semiconductor storage device. It may store a settings profiles 212, movement profiles 214 and profile mappings 216 in some embodiments.

In some embodiments, one or more antennas (not shown in FIG. 1) may be provided as needed for various wireless communication protocols. In some embodiments of the present invention, when the speed sensor 218 detects a new and different speed, a check may be made to determine whether a change in wireless communication protocol should be implemented. Based on the speed of the device, a determination may be made using a profile stored in the storage 210 about whether to change the communication protocol. For example, one reason for changing the communication protocol including may be that the new speed means that given the range of the communication protocol that the communication link will soon be lost and so the change should be implemented.

In some embodiments, a change in a wireless communication protocol involves enabling or disabling a wireless communication interface dedicated for the transmission of data using the wireless communication protocol. In some embodiments, a change in a wireless communication protocol involves transitioning the wireless communication interface for the protocol to a reduced power state (e.g., half-power, sleep/hibernation, etc.). In some embodiments, a change in a wireless communication protocol may involve adjusting an activation duty cycle for the wireless communication protocol. An activation duty cycle for a wireless communication protocol defines how frequently the wireless communication interface polls or searches for a connection. As such, an adjustment in activation duty cycle may involve more frequent or less frequent polls or searches.

In some cases, a default or preferred communication protocol may be used. Absent good reason to change, the default protocol is normally implemented. Thus, in some cases, the default protocol may be a Wi-Fi protocol and based on the speed, this default may be overridden in some cases. For example, given the range of the Wi-Fi protocol, if the device speed is too high, indicating that a link will not be maintained for sufficient time, the Wi-Fi selection may be overridden. In some embodiments, a motion sensor may be used to determine a profile stored in storage 210 (e.g., as described above in relation to the speed sensor 218) based on the detection of new and different speed, acceleration, and/or location.

The mobile device 100 may include a storage device 210 in accordance with various embodiments. The storage device 210 may be implemented using any type of persistent storage. The storage device 210 may be used, for example, to store data in accordance with various embodiments.

In one or more embodiments, a settings profile 212 defines one or more settings for various functions of a mobile device 100. For example, a settings profile 212 in accordance with some embodiments may define the settings for various communication interfaces 104 for a mobile device 100. Examples of settings profiles 212 are provided below in Table 1.

TABLE 1

Settings Profiles for Various Communication Interfaces

| Profile Name | Cellular | Wi-Fi | Bluetooth |
|---|---|---|---|
| Profile 1 | Off | On | Off |
| Profile 2 | On | Off | On |
| Profile 3 | Off | Off | Off |
| Default | On | On | Off |

As shown in the first row of Table 1, Profile 1 is an example of a settings profile 212 in accordance with some embodiments. Profile 1 defines that the mobile device's cellular interface is disabled, the mobile device's Wi-Fi interface is enabled, and the mobile device's Bluetooth interface is disabled. Profile 1 may be used, for example, to define the communication interface settings of the mobile device 100 when the mobile device 100 is presently located in a user's home.

The second through fourth rows of Table 1 show additional examples of settings profiles 212 defined for the mobile device 100 in accordance with some embodiments. Profile 2, for example, may be used to define the communication interface settings for the mobile device 100 when the mobile device 100 is presently located in a moving car. Further, Profile 3 may be used to define the communication interface settings for the mobile device 100 when the mobile device 100 is presently located in a flying airplane. In addition, Profile 4 may be used to define default communication interface settings for the mobile device 100.

In one or more embodiments, a movement profile 214 defines one or more criteria for characterizing movement of a mobile device 100. In accordance with various embodiments, movement may be characterized based on a location for the mobile device 100, a speed determined for the mobile device 100, an acceleration determined for the mobile device 100, and/or any combination of the above. While location, speed, and acceleration have been discussed as examples of movement criteria, one of ordinary skill in the art may recognize that other criteria not discussed here may be used to characterize the movement of a mobile device 100.

In one or more embodiments, movement criteria as defined by the movement profile 214 may be specified in three dimensions. For example, movement criteria may be specified in x, y, and z directions such that x is a north-south component, y is an east-west component, and z is an altitude and/or depth component. As such, a determined speed (i.e., an example of a movement criteria) of the mobile device 100 may have x, y, and z components.

Tables 2 and 3 show examples of movement profiles 214 in accordance with some embodiments. The values expressed in Tables 2 and 3 are provided for illustrative purposes and are not limiting. In accordance with some embodiments, the values defined in a movement profile 214 may be stored quantitatively, qualitatively, as ranges, as maximum or minimum values, etc.

TABLE 2

Movement Profile for a Car

|  | X | Y | Z |
|---|---|---|---|
| Location | land/not sea | land/not sea | 0-25,000 ft |
| Speed | 0 or (10-200) mph | 0 or (10-200) mph | 0-20 mph |
| Acceleration | 1-30 mph$^2$ | 1-30 mph$^2$ | 1-3 mph$^2$ |

Table 2 shows an example of a movement profile 214 for when the mobile device 100 is in a moving car. The movement profile 214 is defined in terms of location, speed, and acceleration over x, y, and components as described above.

TABLE 3

Movement Profile for a Home

| | X | Y | Z |
|---|---|---|---|
| Location | 37 48' 50-51" N | 122 28' 40-41" W | 0-25,000 ft |
| Speed | 0-5 mph | 0-5 mph | 0-1 mph |
| Acceleration | 0-1 mph$^2$ | 0-1 mph$^2$ | 0-1 mph$^2$ |

Table 3 shows an example of a movement profile 214 for when a mobile device 100 is in a user's home. As with Table 2, the movement profile shown in Table 3 is defined in terms of location, speed, and acceleration over x, y, and z components as discussed above.

In one or more embodiments, a profile mapping 216 is defined to associate a movement profile 214 with a settings profile 212. In accordance with various embodiments, multiple movement profiles 214 may be associated with a common settings profile 212. For example, a mobile device user may own numerous homes each with a distinct movement profile (e.g., differing in terms of location components). Accordingly, the mobile device user may decide to associate each distinct movement profile 214 with a single settings profile 212 sufficient to uniformly manage the mobile device functions in each of those home locations. Optionally, the mobile device user may decide to associate each distinct movement profile 214 with different settings profiles 212 to manage the mobile device functions in each of those home locations separately.

Figure 2:
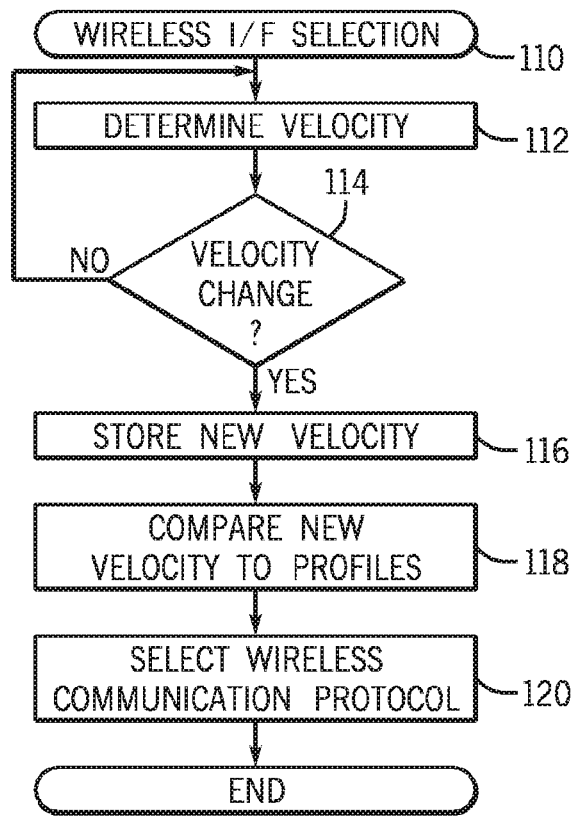
FIG. 2 is a flow chart for a sequence in accordance with some embodiments.

Referring now to FIG. 2, a sequence may be implemented in hardware, software, and/or firmware. In firmware and software embodiments it may be implemented by computer-executed instructions stored in one or more non-transitory computer readable media, such as an optical, semiconductor, or magnetic storage device. In some embodiments, the sequence shown in FIG. 2 may be performed by, for example, a motion-based device controller. In other embodiments, the sequence shown in FIG. 2 may be implemented using any other component(s) inside the mobile device 100.

In FIG. 2, the sequence 110 may initially determine the velocity of the wireless processor-based devices, as indicated in block 112. If a significant velocity change is detected as determined in diamond 114, the new velocity may be stored as indicated in block 116. Then the new velocity may be compared to the profiles as indicated in block 118 to determine whether to change wireless communication protocols based on speed. If so, the new wireless communication protocol may be selected as indicated in block 120.

In some embodiments, the sequence shown in FIG. 2 may be adapted to consider one or more of speed/velocity, acceleration, and/or location.

Figure 3:
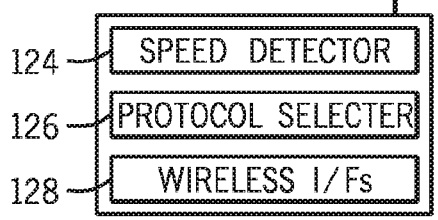
FIG. 3 is a block diagram of a wireless processor-based device in accordance with another embodiment.

Thus referring to FIG. 3, in one embodiment the processor-based device 100 may include one or more antennas 122 coupled to a housing. The housing may include a speed detector 124 in one embodiment corresponding to the speed sensor 218 shown in FIG. 1. Next, the speed detector may be coupled to a protocol selector 126. In some embodiments, the housing may include a motion detector (not shown) as described in relation to FIG. 1. As such, the motion detector may be coupled to a protocol selector 126. In one embodiment, the protocol selector may be hardware logic and in other embodiments, it may be implemented by a processor such as a processor 142 together with appropriate software. In any case, the protocol selector 126 may implement the sequence shown in FIG. 2. In addition, coupled to the protocol selector may be one or more wireless interfaces 104 to implement different selectable wireless communication protocols which may be selected, at least in part, based on speed and in some case in part based on a preferred or default wireless communication protocol.

In one or more embodiments, the processor or selector may be implemented in hardware, software, and/or firmware. In firmware and software embodiments, they may be implemented by computer-executed instructions stored in one or more non-transitory computer readable media, such as an optical, semiconductor, or magnetic storage device. Moreover, embodiments described herein may be implemented as a mobile device, a communications device, or any other apparatus with functionality to process and execute instructions. While the subject matter disclosed herein has been described with respect to a limited number of embodiments, those skilled in the art will appreciate numerous modifications and variations therefrom. Further, specifics in the examples may be used anywhere in one or more embodiments. It is intended that the appended claims cover all such modifications and variations.

In view of the discussion herein, embodiments allow for motion-based management of a mobile device 100. An example is now provided. Assume a user wakes up at home and prepares to drive to the airport to catch a flight. While at home, the processor 102 or protocol selector 120 for the user's mobile device 100 is able to recognize the present location as the user's home based on the speed sensor 218. Moreover, while at home, the mobile device 100 is either stationary (e.g., in a charging dock) or in the possession of the user sitting or walking within the home. As such, the processor or selector determines a relatively low speed and acceleration for the mobile device 100. Based on these values and the recognized position. Profile 1 (e.g., shown in Table 3) is determined as the present movement profile 214 for the mobile device 100 by the processor or selector. Accordingly, the motion-based device controller 110 determines an appropriate settings profile 212 to which Profile 1 is mapped (e.g., using a profile mapping 216). The result is that the Wi-Fi interface 104 is enabled and all others are disabled to make use of the user's wireless local area network at home.

Continuing the example, assume that the user has now packed their bags and is out the door. Before the user starts the car and drives away, the user loads luggage into the car, sits in the driveway in the car, etc. During this lime, the processor or selector determines that the present location for the mobile device 100 is still the user's home. Moreover, the speed and acceleration determined by the processor or selector during this time is still relatively low. Because the mobile device 100 has not yet transitioned away from Profile 1, a new settings profile 212 is not determined at this time and consequently no settings for the mobile device 100 are adjusted. The mobile device 100 continues to make use of the at-home wireless local area network via its Wi-Fi interface 104.

Some time later, the user is now driving away from home and to the airport. Initially (e.g., while driving away on the user's street), the user's location may still be recognized as "home", yet there is a relatively higher speed and acceleration (e.g., greater than walking speed). The higher speed and acceleration result in the processor or selector determining a new movement profile 214 for mobile device 100. Because the location is land-based and the speed and acceleration values are within the suitable range, processor or selector determines a movement profile 214 named Profile 2 (e.g., as shown in Table 2) for the mobile device. Based on its profile mapping 216, Profile 2 is associated with a different settings profile 212 that enables the cellular interface, disables the Wi-Fi interface, and enables the Bluetooth interface. Using the definitions in the new settings profile 212, the processor or selector makes the appropriate settings adjustments for the mobile device 100.

Later, the user has driven far enough away that the present location for the mobile device 100 is no longer recognized by the processor or selector as a "home" location. However, the user is still driving and the speed and acceleration during this time continues to keep the mobile device 100 characterized as Profile 2. Because the same movement profile 214 persists, it is not necessary to determine a different settings profile 212 at this time therefore making further management adjustments of mobile device 100 functions presently unnecessary.

Experiencing some bad luck, the user gets stuck at a railroad crossing. While the user's location is still land-based, the present speed and acceleration fall to zero while the user and the device are waiting for the train to pass. As such, the motion remains within the acceptable range for the movement profile 214 named Profile 2. Once the train passes, the user begins to drive again and still no change in movement profile is required.

Still driving, the user approaches the airport. Up until the moment the user parks the car, the user's mobile device 100 continues to maintain characterization as the movement profile 214 named Profile 2. However, from the time the user parks and begins walking to the airport, the user's speed and acceleration fall out of the acceptable range for the Profile 2. Further, the location is not recognized by the processor or selector. Based on these movement characteristics, the processor or selector determines there is no present movement profile 214 match. Because there is no movement profile 214 match, the default settings profile 212 is selected by the processor or selector and adjustments are made: the cellular interface stays enabled, the Wi-Fi interface is enabled, and the Bluetooth interface is disabled. Using the Wi-Fi interface 206, the mobile device 100 can detect a "hot spot" at the airport and connect to the Internet using the mobile device's Wi-Fi capability.

While the user is at the airport checking in, waiting, and boarding the plane, the user's movement profile does not change. However, once the plane is in flight, a higher speed and acceleration is determined for the mobile device 100 by the processor or selector. Based on the high speed and acceleration, the processor or selector 110 determines a match with an "airplane" movement profile 214. Based on a profile mapping 216 that associates the airplane movement profile 214 with a settings profile 212 stored on the phone, device settings for the mobile device 100 are adjusted by the processor or selector as follows: the cellular interface is disabled; the Wi-Fi interface is disabled; and the Bluetooth interface is disabled.

The following clauses and/or examples pertain to further embodiments:

One example embodiment may be a method including: electronically detecting motion of a mobile processor-based device; and selecting a wireless communication protocol, based at least in part on detected mobile device motion. The method may also include detecting motion using a satellite navigation system. The method may also include selecting one of a plurality of wireless communication interfaces of the mobile device. The method may also include determining whether movement of the mobile device matches a stored movement profile. The method may also include determining whether a present location of the mobile device matches a location specified by the stored movement profile. The method may also include determining that a present speed of the mobile device matches a speed specified by the stored movement profile. The method may also include determining that a present acceleration of the mobile device matches an acceleration specified by the stored movement profile. The method may also include selecting the stored movement profile from a plurality of stored movement profiles stored in the mobile device. The method may also include selecting, based on the stored movement profile, a settings profile describing a setting for a function for the mobile device. The method may also include enabling the function of the mobile device based on the setting for the function described in the settings profile. The method may also include disabling the function of the mobile device based on the setting for the function described in the settings profile. The method may also include selecting a mapping from a plurality of mappings stored in the mobile device, where the mapping associates the stored movement profile with the settings profile. The method may also include: determining that the geographic movement of the mobile device fails to match any existing stored movement profile defined for the mobile device; selecting a default settings profile when the geographic movement of the mobile device fails to match any existing movement profile defined for the mobile device; and enabling a function for the mobile device based on the setting for the function described in the default settings profile.

One example embodiment may be one or more machine readable media comprising a plurality of instructions that in response to being executed on a computing device, cause the computing device to carry out the above-described method.

Another example embodiment may be an apparatus arranged to perform the above-described method. The apparatus may further include an accelerometer. The apparatus may further include a speed sensor. The apparatus may further include a Global Positioning System (GPS) module. The apparatus may further include a cellular telephone interface. The apparatus may further include a Wi-Fi interface. The apparatus may further include an altitude meter. The apparatus may further include a Bluetooth interface.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus of a wireless device, the wireless device including a Wi-Fi interface and a cellular interface, the apparatus comprising:
   a speed sensor including one or more accelerometers;
   memory; and
   processing circuitry, configured to:
   monitor movement of the wireless device by polling signals from the accelerometers exclusive of signals from any other sensor to determine a speed of the wireless device;
   determine, using only the monitored movement, that the wireless device is in a car when the monitored movement indicates a speed in a range of speeds associated with driving or indicates that the wireless device is not moving and previously had a speed in the range of speeds associated with driving;

disable the Wi-Fi interface and provide an indication that the wireless device is not connected to a network via the Wi-Fi interface responsive to the monitored movement indicating that the wireless device is in the car and has a speed in the range of speeds associated with driving;

re-enable the Wi-Fi interface and provide an indication that the wireless device is connected via to the network the Wi-Fi interface responsive to a change in the monitored movement indicating that the wireless device is moving and has a speed less than the range of speeds associated with driving, such that the monitored movement indicates that the wireless device has a speed that is compatible with maintaining Wi-Fi connectivity;

inhibit the Wi-Fi interface from being re-enabled by any process operating on the wireless device, while the monitored movement indicates that the wireless device is in the car; and attempt to maintain cellular network connectivity with the cellular interface when the Wi-Fi interface is disabled.

2. The apparatus of claim 1 wherein when the Wi-Fi interface has an ongoing connection and responsive to the monitored movement indicating a speed that is associated with the wireless device being in the car, configuring the processing circuitry to delay disablement of the Wi-Fi interface, until a cellular network connection is obtained through the cellular interface.

3. The apparatus of claim 2, wherein the processing circuitry is configured to switch the ongoing connection from a Wi-Fi protocol to a cellular network protocol prior to disablement of the Wi-Fi interface.

4. The apparatus of claim 3 wherein the processing circuitry is further configured to:
determine when the monitored movement indicates that the wireless device is not in the car; and
refrain from disablement of the Wi-Fi interface responsive to the monitored movement indicating that the wireless device is not in the car.

5. The apparatus of claim 3 wherein the processing circuitry is further configured to:
determine when the monitored movement indicates a speed that is associated with walking; and
refrain from disablement of the Wi-Fi interface responsive to the monitored movement indicating the speed that is associated with walking.

6. The apparatus of claim 1 wherein the processing circuitry is further configured to delay re-enablement of the Wi-Fi interface, for a predetermined period of time, when the monitored movement indicates that the wireless device is not in the car.

7. The apparatus of claim 6 wherein the processing circuitry is configured to:
disable the Wi-Fi interface of the wireless device when a speed of the wireless device is in the range of speeds associated with driving; and
re-enable the Wi-Fi interface when the speed falls below the range of speeds associated with driving and is greater than zero.

8. The apparatus of claim 1 wherein the processing circuitry is configured to:
receive input to enable a movement profile, the movement profile configured for disabling the Wi-Fi interface when the monitored movement indicates that the wireless device is in the car or has a speed in the range of speeds associated with driving, wherein when the movement profile is enabled, the processing circuitry is configured to:
determine that the monitored movement indicates that the wireless device is in the car or indicates when the monitored movement indicates a speed in the range of speeds associated with driving or indicates that the wireless device is not moving and previously had a speed in the range of speeds associated with driving;
disable the Wi-Fi interface when the monitored movement indicates that the wireless device is in the car and has a speed in the range of speeds associated with driving;
re-enable the Wi-Fi interface responsive to a change in the monitored movement indicating that the wireless device is not in the car;
inhibit the Wi-Fi interface from being re-enabled, by any process operating on the wireless device, while the monitored movement indicates that the wireless device is in the car; and
attempt to maintain cellular network connectivity with the cellular interface when the Wi-Fi interface is disabled.

9. The apparatus of claim 8, wherein the movement profile is one of a plurality of movement profiles, including a movement profile for the wireless device being in a car, a movement profile for the wireless device being at home, a movement profile for the wireless device being in a plane, and a default movement profile to be used when the monitored movement does not conform to the movement profile for the car, the movement profile for at home, or the movement profile for the plane, and
wherein each movement profile is associated with enablement and disablement of the cellular interface, the Wi-Fi interface and/or a Bluetooth interface based on the monitored movement.

10. The apparatus of claim 1 wherein the processing circuitry is configured with executable instructions stored in the memory.

11. A non-transitory computer-readable storage medium that stores instructions for execution by processing circuitry of a wireless device to configure the device to perform operations to:
monitor movement of the wireless device using signals from a speed sensor including one or more accelerometers in the wireless device exclusive of signals from other sensors by polling the accelerometers to determine a speed of the wireless device;
determine, using only the monitored movement, that the wireless device is in a car when the monitored movement indicates a speed in a range of speeds associated with driving or indicates that the wireless device is not moving and previously had a speed in the range of speeds associated with driving;
disable a Wi-Fi interface and provide an indication that the wireless device is not connected to a network via the Wi-Fi interface responsive to the monitored movement indicating that the wireless device is in the car and has a speed in the range of speeds associated with driving;
re-enable the Wi-Fi interface and provide an indication that the wireless device is connected to the network via the Wi-Fi interface responsive to the monitored movement indicating that the wireless device has a speed less than the range of speeds associated with driving, such that the monitored movement indicates that the wireless device is not stopped and has a speed compatible with maintaining Wi-Fi connectivity; and inhibit the Wi-Fi interface from being re-enabled, by any process operating on the wireless device while the monitored movement indicates that the wireless device is in the car.

12. The non-transitory computer-readable storage medium of claim 11, wherein the processing circuitry is configured to attempt to maintain cellular network connectivity via a cellular interface when the Wi-Fi interface is disabled; and, when the Wi-Fi interface transitions from being disabled to being enabled, attempt to maintain cellular network connectivity with the cellular network until the wireless device can connect to a network using the Wi-Fi interface.

13. The non-transitory computer-readable storage medium of claim 12, wherein when the Wi-Fi interface has an ongoing connection and when the monitored movement indicates that the wireless device is in the car, the processing circuitry is configured to delay disablement of the Wi-Fi interface, until a cellular network connection is obtained through the cellular interface; and
 wherein the processing circuitry is configured to switch the ongoing connection from a Wi-Fi protocol to a cellular network protocol prior to disablement of the Wi-Fi interface.

14. The non-transitory computer-readable storage medium of claim 11, wherein the processing circuitry is further configured to:
 determine when the monitored movement is associated with walking; and
 refrain from disablement of the Wi-Fi interface when the monitored movement is associated with walking.

15. The non-transitory computer-readable storage medium of claim 11, wherein signals from the speed sensor constitute signals from a GPS receiver.

16. An apparatus of a wireless device, the wireless device including a Wi-Fi interface and a cellular interface, the apparatus comprising:
 memory; and
 processing circuitry, configured to:
 receive input to enable a first movement profile indicating that the wireless device is in a car using only monitored movement signals that indicate a speed in a range of speeds associated with driving or that indicate that the wireless device is not moving and that the wireless device previously had a speed in the range of speeds associated with driving or to enable a second movement profile indicating that the wireless device is moving and has a speed within a range of speeds associated with walking, the range of speeds associated with walking being less than the range of speeds associated with driving;
 monitor activity of the wireless device by polling signals from one or more accelerometers, exclusive of of signals from any other sensor, to provide the monitored movement signals indicating a speed of the wireless device; and,
 according to the first and second profiles:
 determine, using only the monitored movement signals, that the wireless device is in the car, or that the wireless device has a speed in a range of speeds associated with walking;
 disable the Wi-Fi interface and provide an indication that the wireless device is not connected to a network via the Wi-Fi interface responsive to the monitored movement signals indicating that the wireless device is in the car;
 re-enable the Wi-Fi interface and provide an indication that the wireless device is connected to the network via the Wi-Fi interface when the monitored movement signals indicate that the wireless device has a speed in the range of speeds associated with walking;
 inhibit the Wi-Fi interface from being re-enabled, by any process operating on the wireless device, while the monitored movement signals indicate that the wireless device is in the car;
 refrain from disabling the Wi-Fi interface when the monitored movement signals indicate a speed in the range of speeds associated with walking; and
 configure the device to maintain cellular network connectivity with the cellular interface when the Wi-Fi interface is disabled.

17. The apparatus of claim 16 wherein when the Wi-Fi interface has an ongoing connection and when the monitored movement signals indicate a speed in the range of speeds associated with driving or that the wireless device is in the car, the processing circuitry is configured to delay disablement of the Wi-Fi interface, until a cellular network connection is obtained through the cellular interface; and
 wherein the processing circuitry is configured to switch the ongoing connection from a Wi-Fi protocol to a cellular network protocol prior to disablement of the Wi-Fi interface.

18. The apparatus of claim 16 wherein the first movement profile is configured for disablement of the Wi-Fi interface when the monitored movement signals indicate that the wireless device is in the car,
 wherein the apparatus includes a plurality of movement profiles, including the first movement profile for the car, the second movement profile for walking, a movement profile for at home, a movement profile for a plane, and a default profile to be used when the monitored movement signals do not conform to the movement profile for the car, the movement profile for walking, the movement profile for at home, or the movement profile for the plane,
 wherein each movement profile of the plurality of movement profiles is associated with enablement and disablement of the cellular interface, the Wi-Fi interface and/or a Bluetooth interface based on the monitored movement signals.

19. An apparatus of a wireless device, the wireless device including a Wi-Fi interface and a cellular interface, the apparatus comprising:
 a speed sensor including one or more accelerometers;
 memory; and
 processing circuitry, configured to:
 monitor movement of the wireless device by polling signals from the one or more accelerometers exclusive of signals from any other sensor to determine a speed of the wireless device;
 select a movement profile from among a plurality of movement profiles based on the monitored movement;
 selectively disable the cellular interface and enable the Wi-Fi interface when the monitored movement indicates that the wireless device is moving and has a speed associated with walking or is stopped and previously had a speed associated with walking or selectively disable the Wi-Fi interface and enable the cellular interface when the monitored movement indicates that the wireless device is moving and has a speed associated with driving or is stopped and previously had a speed associated with driving;

inhibit the Wi-Fi interface from being re-enabled, by any process operating on the wireless device, while the monitored movement signals indicate that the wireless device is moving and has a speed associated with driving or is stopped and previously had a speed associated with driving; and provide an indication that the wireless device is connected to a network via the Wi-Fi interface when the Wi-Fi interface is enabled and connected to a cellular network via the cellular interface when the cellular interface is enabled.

20. The apparatus of claim 19, wherein the plurality of movement profiles include a movement profile for the wireless device being in a car, a movement profile for the wireless device being at home, a movement profile for the wireless device being in a plane, and a default movement profile to be used when the monitored movement does not conform to the movement profile for the car, the movement profile for at home, or the movement profile for the plane.

* * * * *

UNITED STATES PATENT AND TRADEMARK OFFICE
CERTIFICATE OF CORRECTION

PATENT NO. : 10,772,030 B2
APPLICATION NO. : 15/274833
DATED : September 8, 2020
INVENTOR(S) : Mohammad Shahid Page 1 of 1

It is certified that error appears in the above-identified patent and that said Letters Patent is hereby corrected as shown below:

On the Title Page

On page 2, in Column 2, under "Other Publications", Line 1, before "filed", insert --Response-- therefor On page 2, in Column 2, under "Other Publications", Line 24, delete "Patenatability" and insert --Patentability-- therefor In the Claims In Column 11, Line 54, in Claim 16, delete "of of" and insert --of-- therefor Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*